US006574464B1

(12) United States Patent
Chen

(10) Patent No.: US 6,574,464 B1
(45) Date of Patent: Jun. 3, 2003

(54) APPARATUS AND METHOD FOR REAL-TIME RATE CHANGES FOR TELECOMMUNICATION SERVICES

(75) Inventor: Ben-Ren Chen, Northboro, MA (US)

(73) Assignee: Verizon Laboratories Inc., Waltham, MA (US)

( * ) Notice: Subject to any disclaimer, the term of this patent is extended or adjusted under 35 U.S.C. 154(b) by 339 days.

(21) Appl. No.: 09/631,759

(22) Filed: Aug. 3, 2000

(51) Int. Cl.[7] .............................................. H04M 11/00
(52) U.S. Cl. ........................ 455/406; 455/405; 455/408
(58) Field of Search ................................. 455/406, 405, 455/408, 432

(56) References Cited

U.S. PATENT DOCUMENTS

| 5,974,308 | A | * | 10/1999 | Vedel .......................... 379/130 |
| 6,018,652 | A | * | 1/2000 | Frager et al. ............... 455/406 |
| 6,018,653 | A | * | 1/2000 | Hietalahti et al. .......... 455/406 |
| 6,041,110 | A | | 3/2000 | Lautenschlager et al. ... 379/201 |
| 6,044,142 | A | | 3/2000 | Hammarström et al. .... 379/223 |
| 6,044,259 | A | | 3/2000 | Hentilä et al. ............... 455/406 |
| 6,044,264 | A | | 3/2000 | Huotari et al. ............... 455/414 |
| 6,044,269 | A | | 3/2000 | Talagery ...................... 455/433 |
| 6,044,274 | A | | 3/2000 | Vo et al. ...................... 455/461 |
| 6,201,957 | B1 | * | 3/2001 | Son et al. .................... 455/406 |
| 6,205,326 | B1 | * | 3/2001 | Tell et al. .................... 455/406 |
| 6,256,504 | B1 | * | 7/2001 | Tell et al. .................... 455/403 |
| 6,345,181 | B1 | * | 2/2002 | Janhonen et al. ........... 455/406 |
| 6,347,224 | B1 | * | 2/2002 | Smyth et al. .......... 379/112.01 |
| 6,393,269 | B1 | * | 5/2002 | Hartmaier et al. .......... 455/406 |
| 6,424,840 | B1 | * | 7/2002 | Fitch et al. .................. 455/456 |
| 6,434,380 | B1 | * | 8/2002 | Andersson et al. ......... 455/406 |

OTHER PUBLICATIONS

*Electronics Engineers' Handbook*, A.B. Brown, Jr., Ch. 26, "Telecommunications," ed. Donald Christiansen, McGraw–Hill, 1997, pp. 26.1–26.85.

*The Communications Handbook*, A. Michael Noll, Ch. 22, Plain Old Telephone Service (POTS), Ed. Jerry D. Gibson CRC Press, Inc., 1997, pp. 291–300.

*The Communications Handbook*, A.R. Modaressi, et al., Ch. 35, "Overview of Common Channel Signal," Ed. Jerry D. Gibson, CRC Press, Inc., 1997, pp. 480–495.

* cited by examiner

*Primary Examiner*—Thanh Cong Le
*Assistant Examiner*—Andrew T Harry
(74) *Attorney, Agent, or Firm*—Leonard Charles Suchyta; James K. Weixel

(57) ABSTRACT

A network system capable of changing the billing rate for a telecommunication service includes Service Switching Point (SSP) (7) and a Service Control Point (SCP) (9). The SSP (7) implements call management by performing switching functions for placing a call, and implements service selection functions by detecting service indicators associated with the call. The SSP (7) also activates interactions with the SCP (9), which contains logic programs used for providing the indicated service. Signaling System 7 (SS7) of the Common-Channel Interoffice Signaling (CCIS) system is used for digital signaling between the SCP (9) and the SSP (7). When a user initiates a call, the SSP (7) acquires user data and trigger information from a Service Data Base (SDB) (11) associated with the SCP (9). During the call, when the SSP (7) detects that a trigger corresponding to the trigger information has been activated, the SSP (7) subsequently activates a SCP whose address the activated trigger gives. The SCP, in turn, activates a logic program to switch the billing rate for the remainder of the call to a new billing rate, and provides the new billing information to the SSP (7), which stores the new billing information in the call's detailed record and which continues processing the call according to the new billing rate.

17 Claims, 19 Drawing Sheets

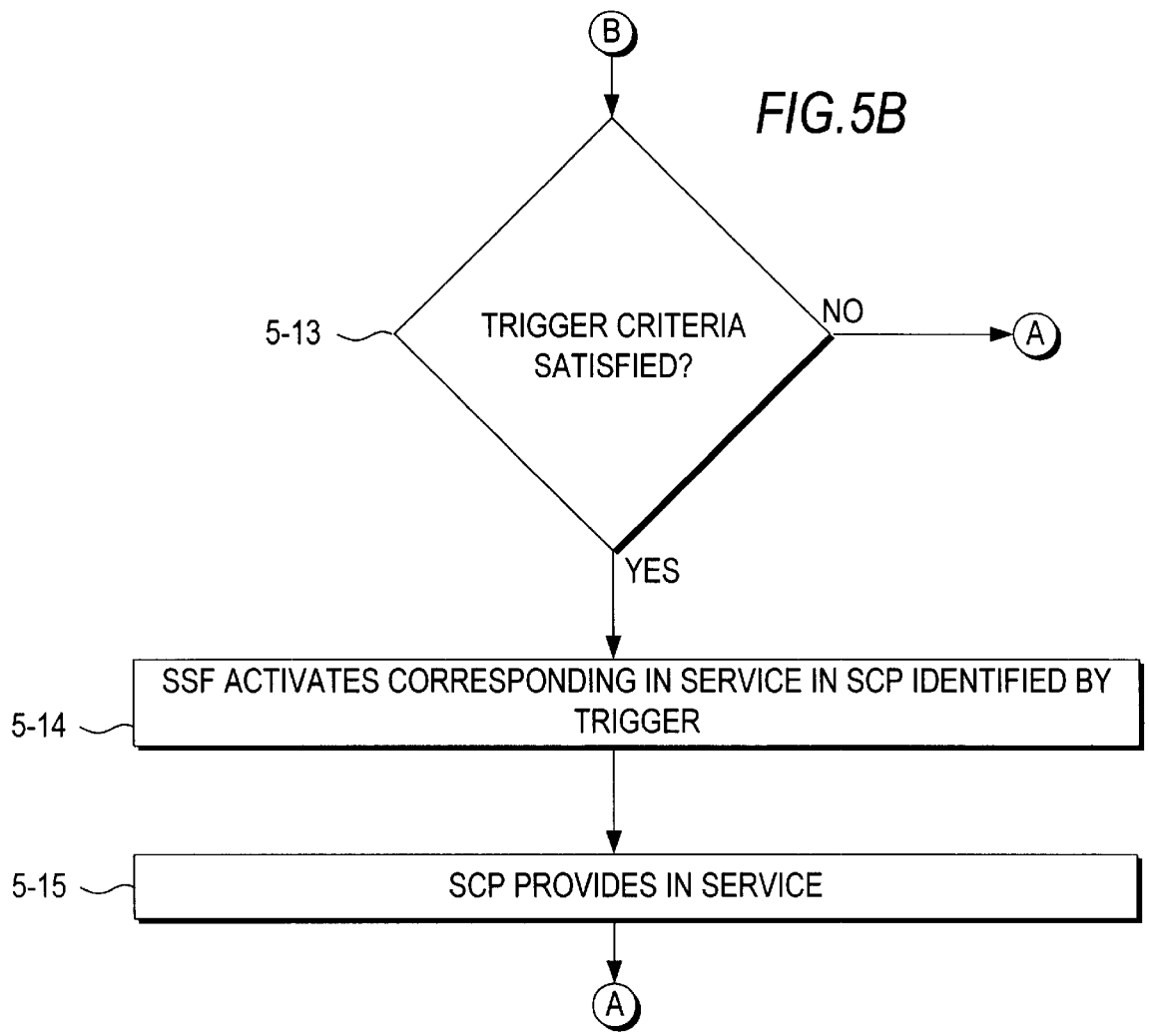

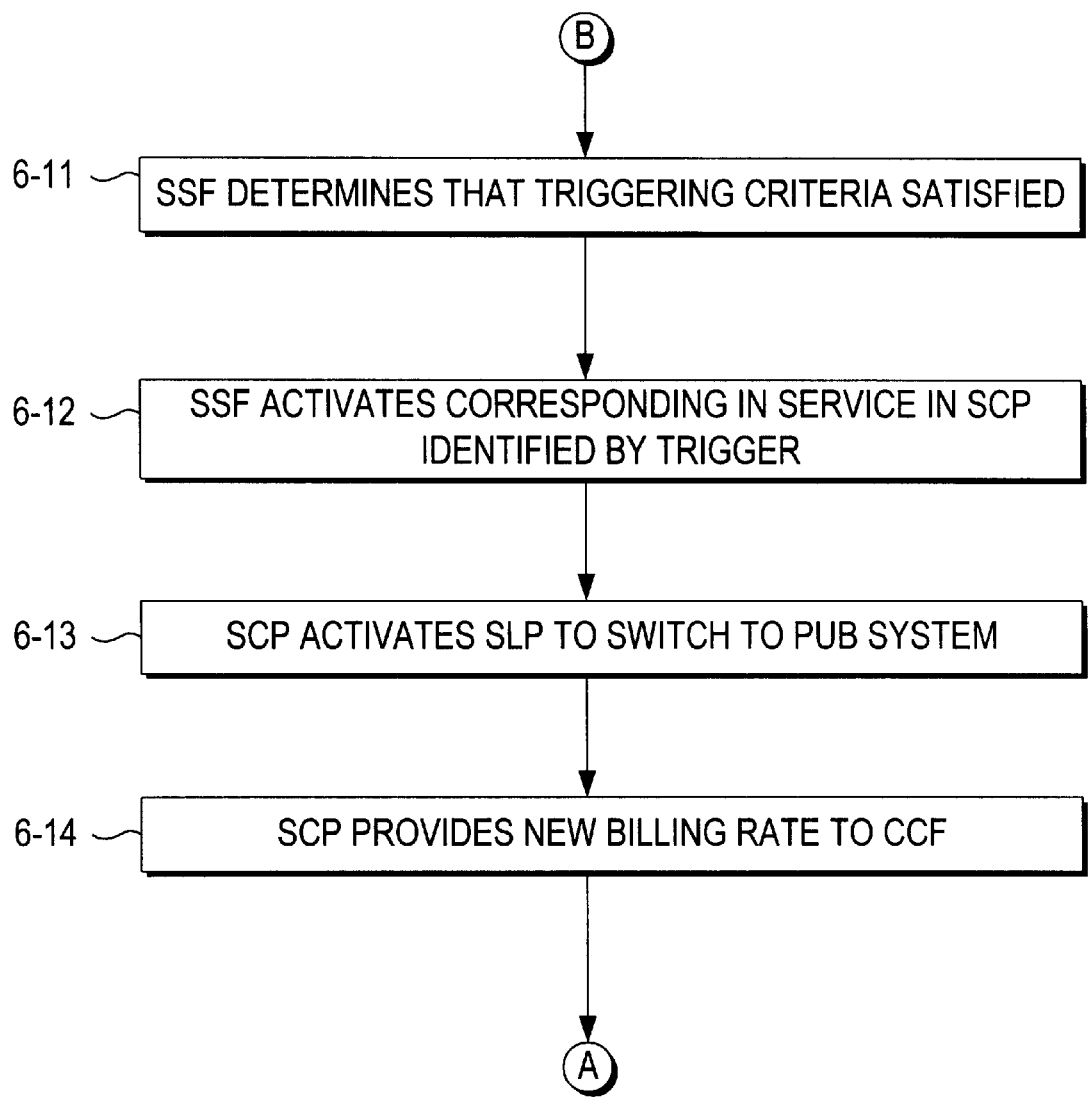

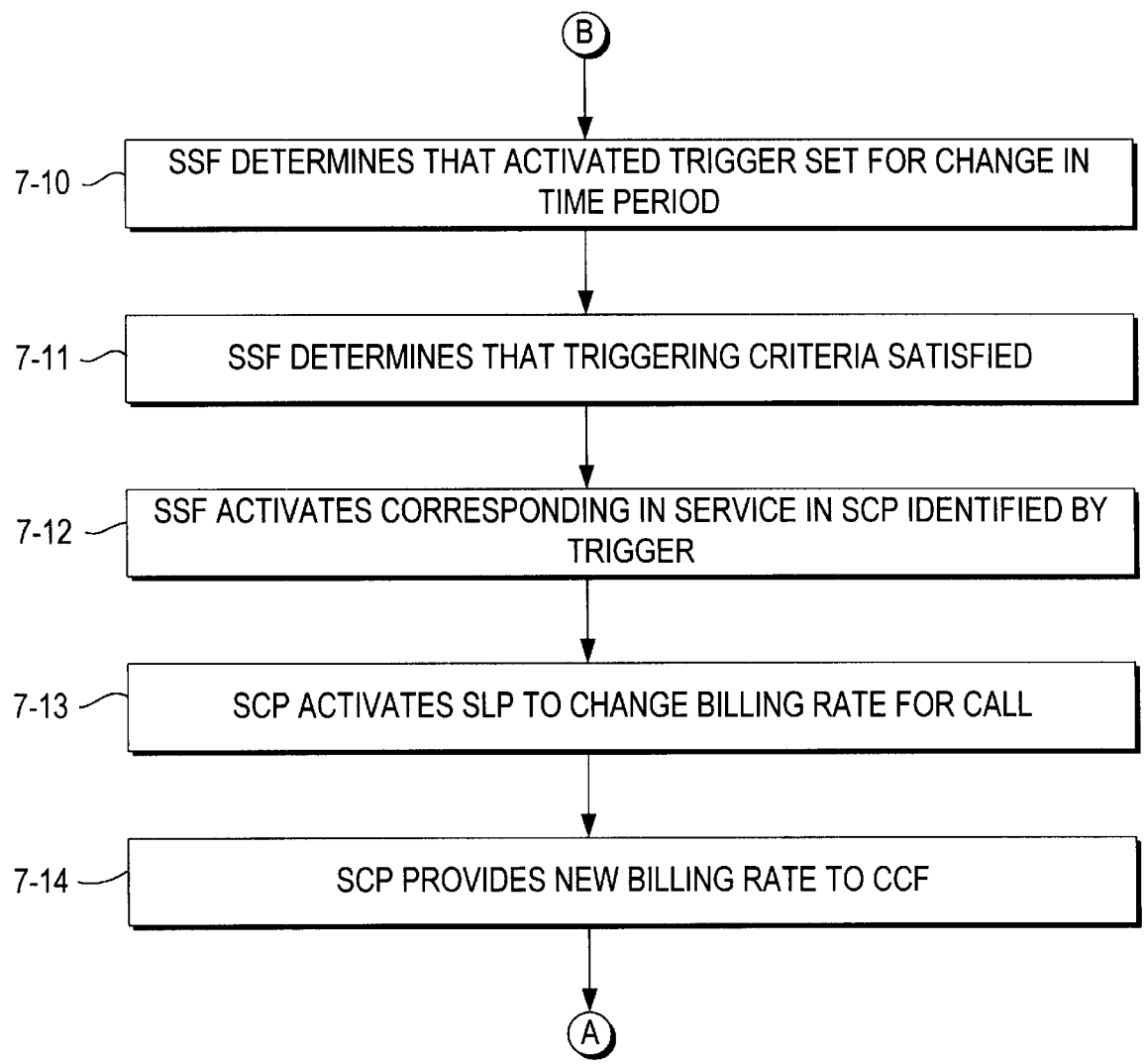

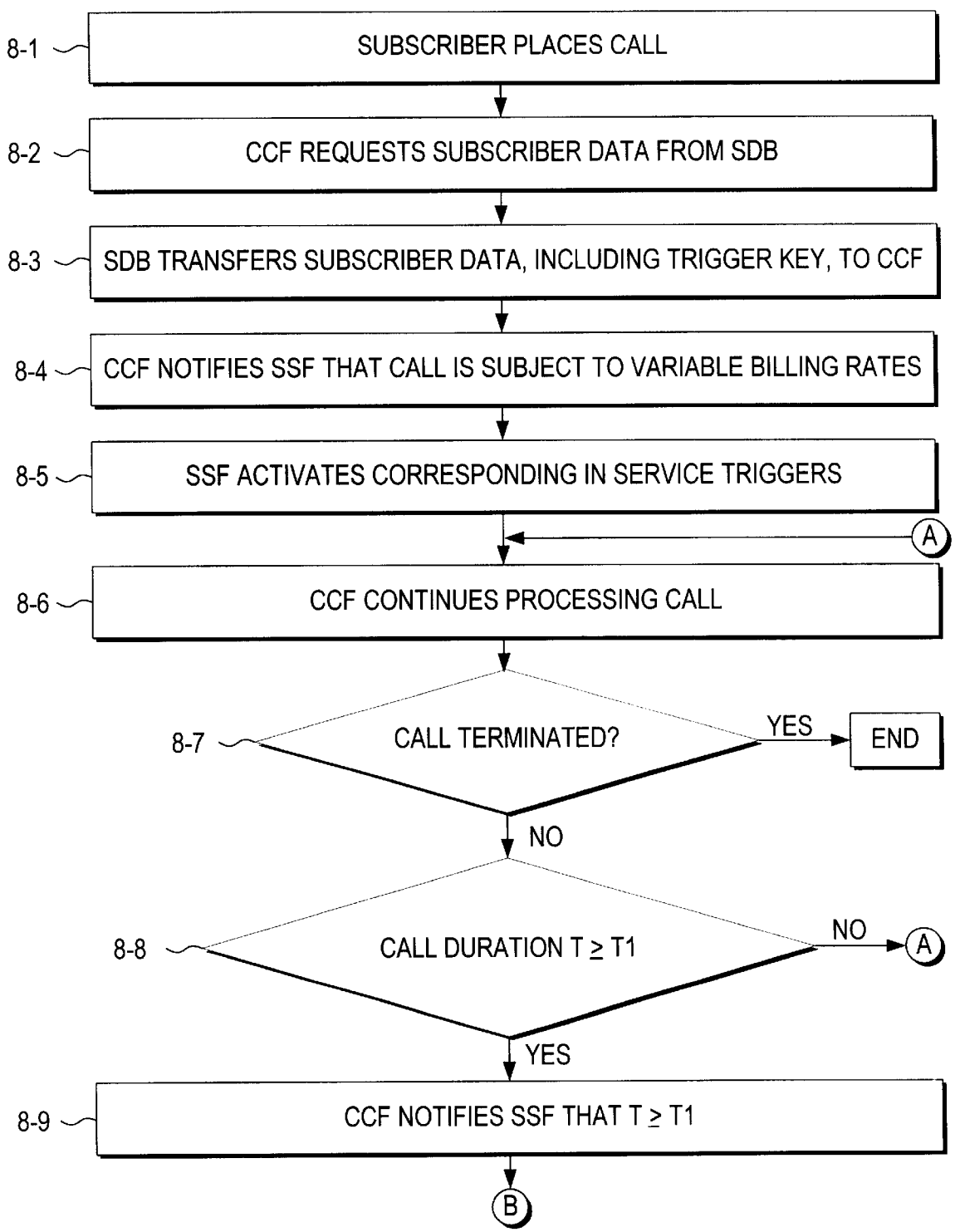

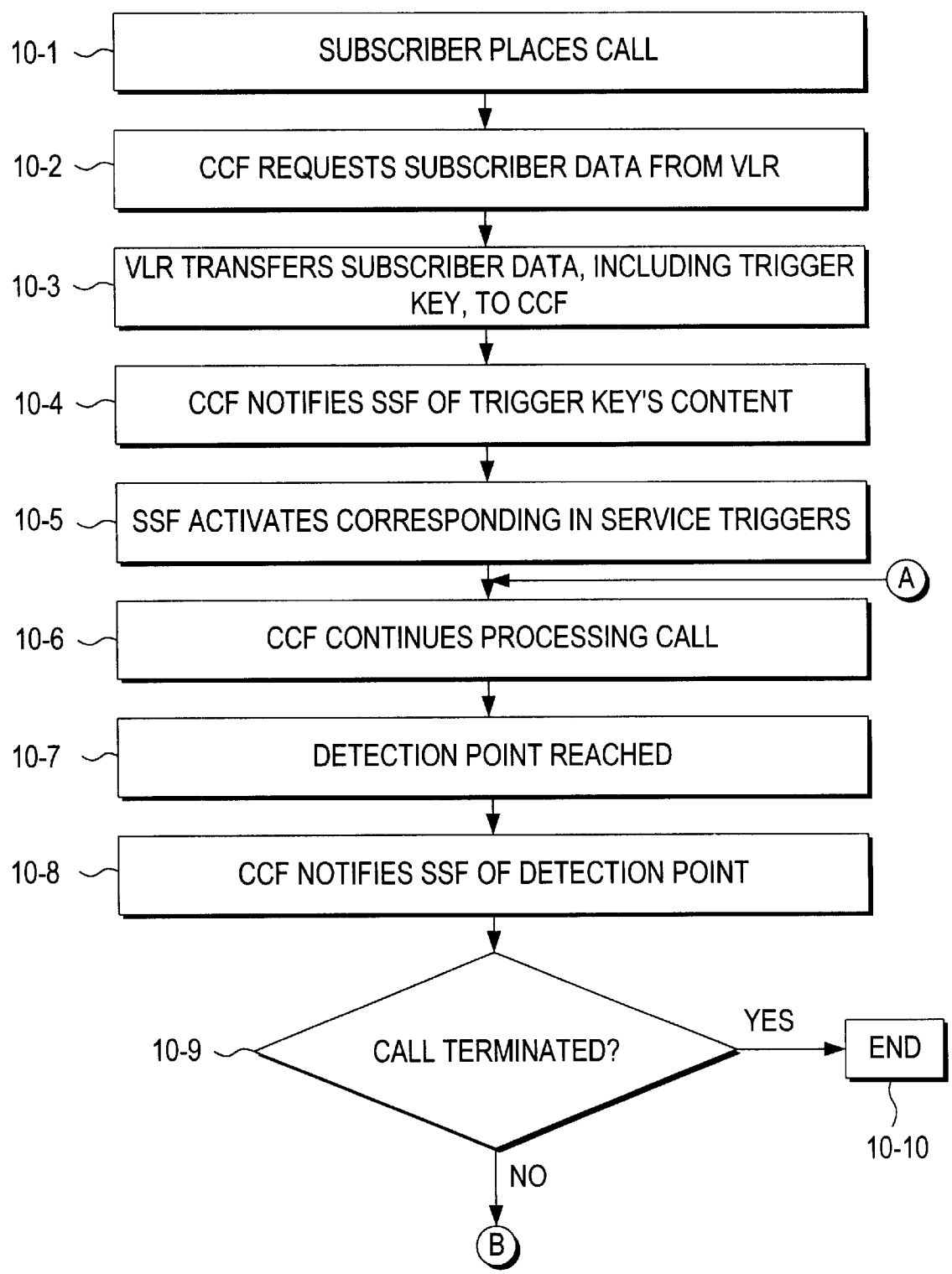

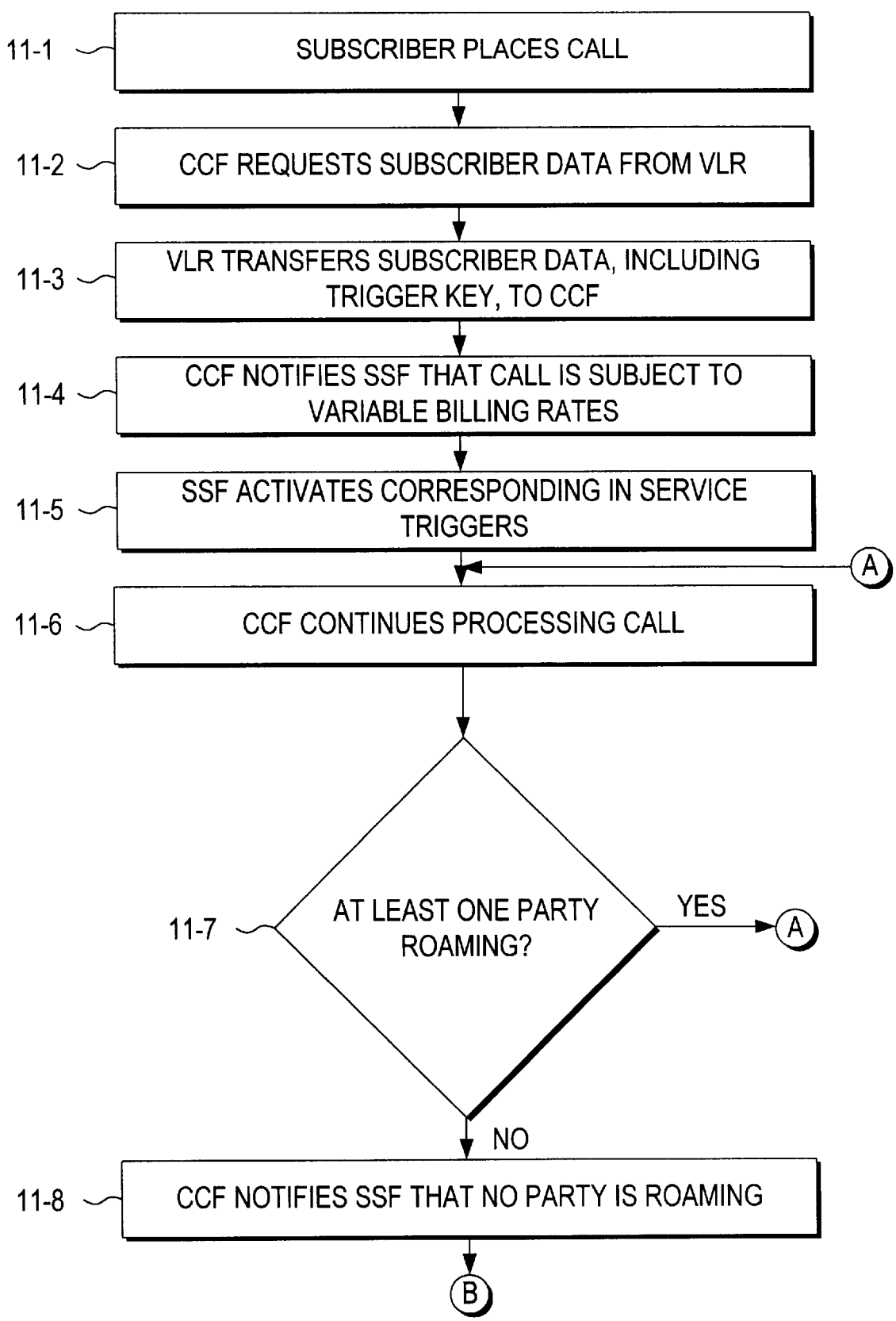

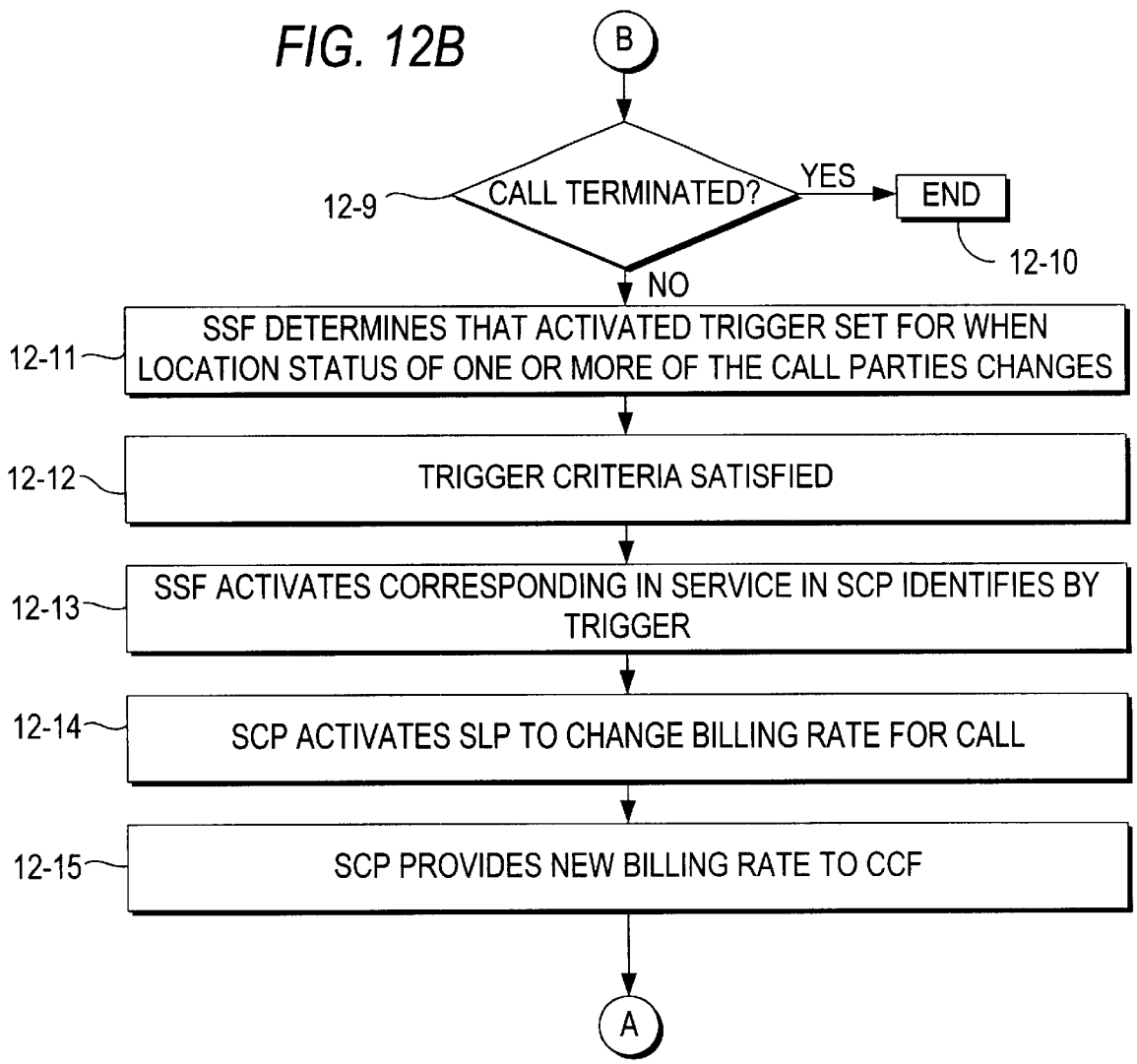

APPARATUS AND METHOD FOR REAL-TIME RATE CHANGES FOR TELECOMMUNICATION SERVICES

BACKGROUND OF THE INVENTION

1. Field of the Invention

The present invention relates generally to an apparatus and method used in the telecommunication industry. More particularly, the present invention relates to an apparatus and method for changing a billing rate for a telecommunication service, while the service is being rendered.

2. Related Art

Telecommunication involves the transfer of information, such as voice, data, video and facsimile information, from one point to another. The facilities used for providing any particular form of telecommunication service are known as service networks. A service network is made up of terminals, into which the information enters and from which the information leaves the network; transmission facilities, which transfer the information from place to place; and switches, which connect the appropriate transmission facilities to enable the information to be delivered to the desired destination.

An example of a telecommunication terminal is the ubiquitous telephone. In their most basic form, telephones are part of a Public Switched Telephone Network (PSTN), which enables users to reach other users at any time and to speak to each other in their natural voices. The PSTN, in addition to enabling voice communication, can be used with facsimile machines for graphical communication, and with modems for data communication via personal computers. The continued growth in telephone usage time, in the number of access lines, and in the revenue of telephone service providers attests to the importance of telephone service in today's global, information-age society.

Users who are traveling can also take advantage of telecommunication services by using mobile, or wireless, telephones, which are part of a Mobile Telecommunication Network (MTN). Travelers communicate with other travelers via radio waves transmitted by cellular base stations and satellites. Also, the MTN and the PSTN are interconnected, thus enabling communication between mobile telephones and fixed, or wired, telephones.

Today's telecommunication networks utilize electronic switching systems, which consists of two major functional parts: a switching network that connects one telephone to another when a call is made, and a control unit that determines the specific connections for the call. Most modern switching systems are completely digital; telephone signals either arrive at a switching system as digital signals or are converted to digital signals by special circuitry before being switched.

Electronic switching systems are controlled by programmable digital computers that implement Stored-Program Control (SPC). SPC provides flexibility and power to easily augment and modify switching-system capabilities using stored programs. A network of SPC switching systems form the backbone of an Intelligent Network (IN). Services that are possible within a particular SPC switching system may be extended to the entire IN.

Presently, two main methods are used for charging for telecommunication services: Post-Usage Billing and Pre-Paid Charging. Post-Usage Billing (PUB) allows a subscriber with a pre-approved credit account to pay for telecommunication services after the services have been rendered. Typically, PUB is used for wired telephone calls via the PSTN, as well as wireless telephone calls via the MTN. A subscriber receives a monthly bill for calls made during the previous month.

The Pre-Paid Charging (PPC) system allows a user to pre-pay for telecommunication services. That is, the user pays for calls before the calls are made. A well-known example of PPC occurs with pre-paid calling cards. Each time a call is made, the amount in the user's PPC debit account is decreased in real time for the time elapsed during the call. PPC programs are traditionally attractive to users who are unable to secure a pre-approved credit account.

One drawback of the current PUB and PPC systems is that the billing rate for a call is set once the call is initiated. That is, the billing rate cannot be changed mid-call. Therefore, if a subscriber initiates a wireless call outside of a predetermined calling area, that call will be billed at the higher "roaming" rates even if the subscriber travels into the predetermined calling area during the call. Also, if a subscriber initiates a call-during peak calling times, and then continues the call after the lower evening rates begin, the subscriber has to pay the higher peak-time rates for the entire call.

An additional drawback of the current PPC and PUB systems is that a call cannot be switched mid-call between the two systems. Therefore, if a caller using a pre-paid calling card depletes the funds in the card account during a call, the call terminates because there is no way to switch from the PPC debit system of the calling card to the PUB credit system.

The examples described above are just a few of many situations in which it is desirable to be able to change the billing rate for telecommunication services in real time, that is, while the services are being rendered.

SUMMARY OF INVENTION

An object of the present invention is to provide a system for changing a billing rate for a telecommunication service, while the service is being rendered.

According to the invention, an. Intelligent Network (IN) changes the billing rate charged for a call at least once during the call when one or more predetermine triggers are satisfied. The IN has predefined therein a plurality of triggers, with each subscriber having individualized triggers triggering services specific to the subscriber.

According to one aspect of the present invention, the predetermined triggers include one or more triggers for switching the billing system for a call from a Pre-Paid Charging (PPC) system to a Post-Usage Billing (PUB) system when funds reach a predetermined value in the PPC system. The billing system is switched while the call is taking place without any interruption to the call.

According to another aspect of the present invention, the predetermined triggers include one or more triggers for changing the billing rate for a call when the call, initiated during a first time period having a first billing rate, continues into a second time period having a second billing rate. The call will be charged at the first billing rate for the time elapsed during the first time period, and charged at the second billing rate for the time elapsed during the second time period.

In yet another aspect of the present invention, the predetermined triggers include one or more triggers for changing the billing rate for an entire call, or a portion thereof, for one or more predetermined subscribers based on the length of the call.

Yet another aspect of the present invention, the predetermined triggers include one or more triggers for changing the billing rate for an entire call, or a portion thereof, for one or more predetermined subscribers based on the location of the called party.

In still another aspect of the present invention, the predetermined triggers include one or more triggers for changing the billing rate for a mobile call when the subscriber/calling party moves in or out of a predetermined area.

In yet another aspect of the present invention, the predetermined triggers include one or more triggers for changing the billing rate for a mobile call when the subscriber/called party moves in or out of a predetermined area.

According to one embodiment, an apparatus for billing a subscriber for a service delivered over a network is provided. The apparatus includes an electronic memory configured to store a record and trigger information for the subscriber, an electronic detector circuit configured to detect whether a trigger corresponding to the trigger information has occurred during the service, and an electronic control circuit configured to change a billing rate for the service, while the service is being provided, when the detector circuit detects that the trigger has occurred.

According to another embodiment, a programmable computer for use in billing a subscriber for a service delivered over a network is provided. The programmable computer includes at least one memory including at least one region for storing computer-executable program code, and a processor for executing the program code stored in the memory. The program code includes code for accessing from a data base a record and trigger information corresponding to the subscriber, code for detecting whether a trigger corresponding to the trigger information has been satisfied, and code for changing a billing rate for the service, while the service is being provided, when the code for detecting detects that the trigger has been satisfied.

In another embodiment, a method of billing a subscriber for a service delivered over a network is provided. The method includes the steps of accessing from a data base a record and trigger information corresponding to the subscriber, detecting whether a trigger corresponding to the trigger information has been satisfied, and changing a billing rate for the service, while the service is being provided, when the detecting step detects that the trigger has been satisfied.

In still another embodiment, a computer-readable storage medium storing a program for implementing a method of billing a subscriber for a service delivered over a network is provided. The program includes code for an accessing step of accessing from a data base a record and trigger information corresponding to the subscriber, code for a detecting step of detecting whether a trigger corresponding to the trigger information has been satisfied, and code for a rate changing step of changing a billing rate for the service, while the service is being provided, when the detecting step detects that the trigger has been satisfied.

In still another embodiment, an apparatus for billing a subscriber for a service delivered over a network is provided. The apparatus includes memory means for storing a record and trigger information for the subscriber, detector means for detecting whether a trigger corresponding to the trigger information has occurred during the service, and control means for changing a billing rate for the service, while the service is being provided, when the detector means detects that the trigger has occurred.

These and other object, features, and advantages will be apparent from the following description of the preferred embodiments of the present invention.

BRIEF DESCRIPTION OF THE DRAWINGS

The present invention will be more readily understood from a detailed description of the preferred embodiments taken in conjunction with the following figures.

FIGS. 5A and 5B, 6A and 6B, 7A and 7B, and 8A and 8B are flowcharts describing uses of trigger keys in providing Intelligent Network services;

FIGS. 10A and 10B, 11A and 11B, and 12A and 12B are flowcharts describing uses of trigger keys in-providing Mobile Intelligent Network services.

DETAILED DESCRIPTION OF THE PREFERRED EMBODIMENTS

An Intelligent Network (IN) is an architecture that can be incorporated into most telecommunication networks, regardless of the network technology used, to make implementation and controlling of services faster, easier, and more flexible. The "intelligence" of the network relates to its ability to have access to stored data, to process it, and to make decisions based on the stored data.

In an IN, flexibility and ease in implementing IN services is achieved by removing control of the IN services from the switching systems of the network, which control conventional services in basic telecommunication networks, and by placing the control in separate modular units associated with the switching systems. The modular units are connected to one another, and act as components when new IN services are provided, thus making it easier to define and design new IN services. Also, the IN services are provided independent of the IN, that is, the IN services are separate from the lowest physical network structure, enabling them to be distributed. Thus, the IN services are provided independent of the operation of the IN, and changes in the structure of the IN, as well as changes in the operation software of the IN, are not required when altering the IN services provided by the IN.

Figure 1:
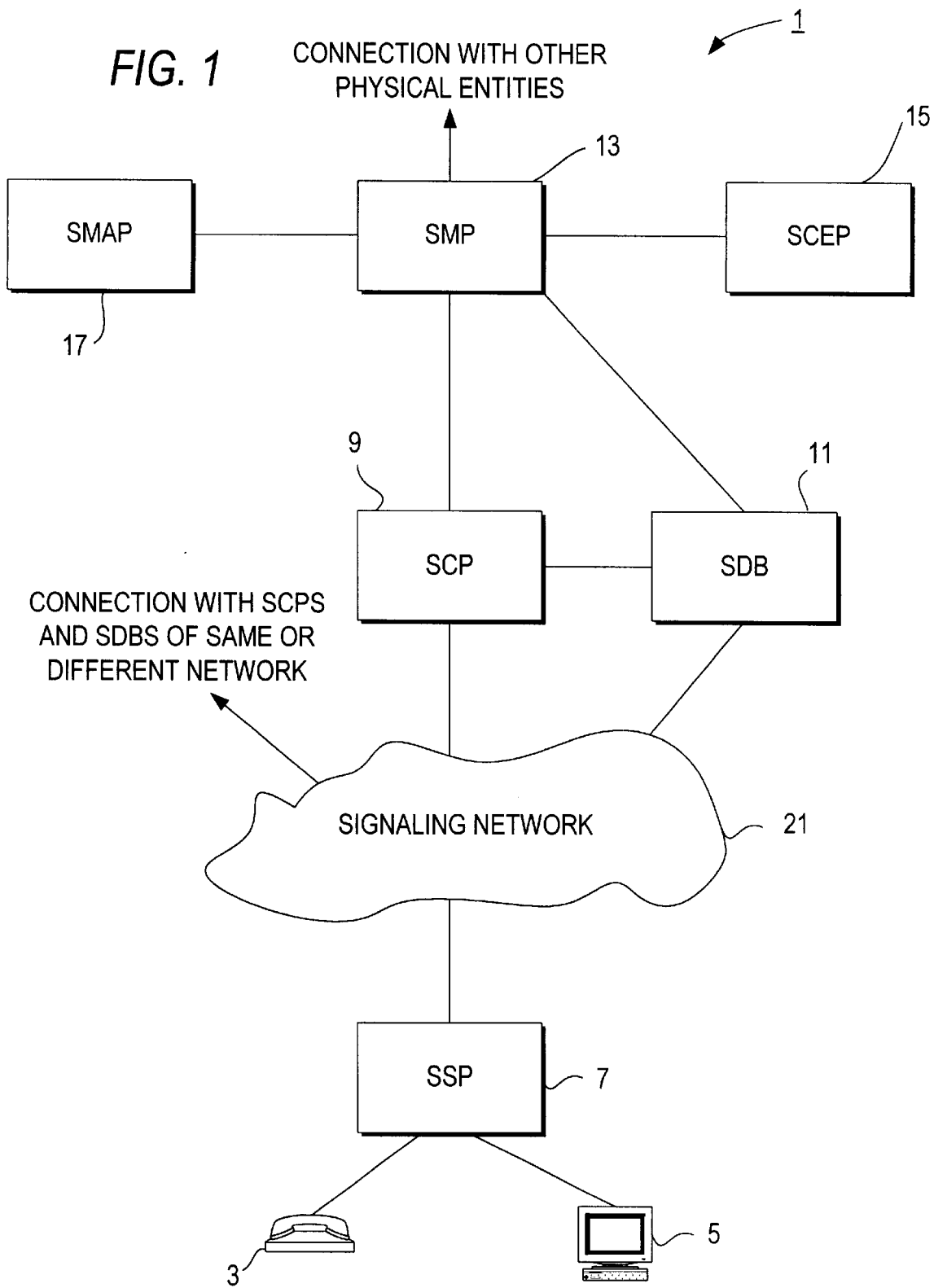
FIG. 1 is a schematic diagram of an Intelligent Network according to an embodiment of the present invention.

An IN 1 is schematically shown in FIG. 1. A subscriber accesses the IN 1 via a terminal, such as a telephone 3 or a computer 5, for example. The terminal serves as an interface between the subscriber and a Service Switching Point (SSP) 7, which is a node of the IN 1 that gives the subscriber access to the IN 1. Operationally, the SSP 7 implements call management by performing the switching functions for placing a call, and also implements IN service selection functions by detecting IN service requests of the IN 1 and activating interactions with a Service Control Point (SCP) 9.

The SCP 9 is a node of the IN 1 that contains logic programs used for providing the IN services. Although only one SCP 9 is shown in FIG. 1, it should be understood that the IN 1 may contain more than one SCP 9. A Service Data Base (SDB) 11 associated with the SCP 9 contains data that the logic programs of the SCP 9 use to perform individualized IN services. A Service Management Point (SMP) 13 associated with the SCP 9 controls the management, supply, and performance of the IN services, and can be connected to other physical entities. A Service Creation Environment Point (SCEP) 15 associated with the SCP 9 is used for defining, developing, and testing IN services, and for supplying an IN service to the SMP 13. A Service Management Access Point (SMAP) 17 associated with the SCP 9 is a physical entity that provides certain subscribers with a connection to the SMP 13.

Optionally, the IN 1 may include a Service Switching and Control Point (SCCP) (not shown), which consists of a SCP and a SSP combined into one node.

A signaling network 21 transfers signals between the SSP 7 and the SCP 9. In the U.S., Signaling System 7 (SS7) of the Common-Channel Interoffice Signaling (CCIS) system is used for digital signaling between the SCP 9 and the SSP 7. SS7 is also used for signaling between different SCPs. With CCIS systems, a separate dedicated data-channel is used solely to carry signaling information in the form of short packets of data. By ID appropriately encoding the data stream, a variety of signals needed for both addressing and supervisory control, as well as for service enhancements, can be transmitted at high speeds. Less widely used is Signaling System 6 (SS6) of the CCIS system, which is used for analog signaling.

Figure 2:
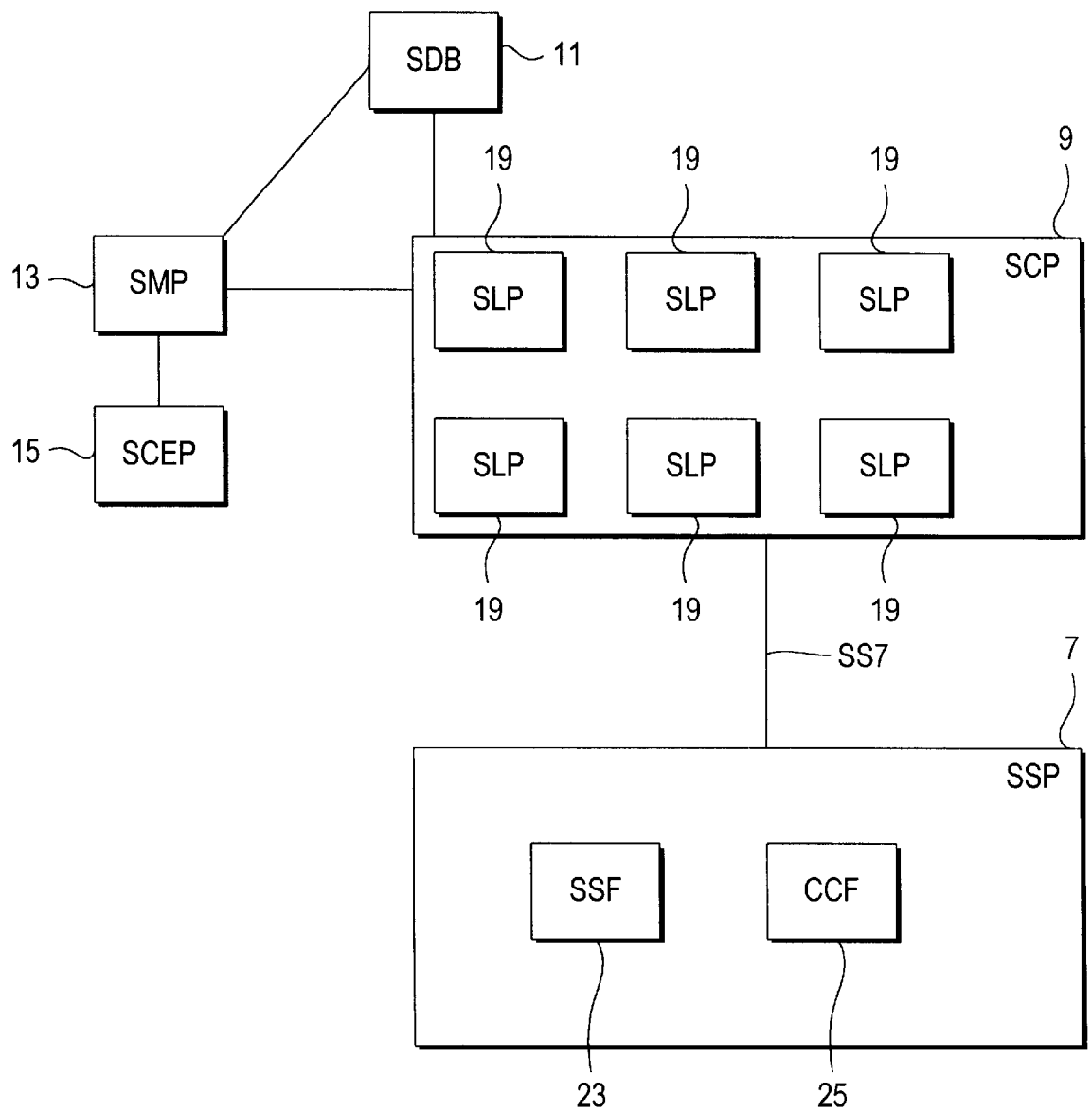
FIG. 2 is a schematic diagram of a Service Switching Point and a Service Control Point of the Intelligent Network of FIG. 1.

The SSP 7 and the SCP 9 are schematically shown in FIG. 2. Control of the IN services provided by the IN 1 is in the SCP 9. The SCP 9 contains Service Logic Programs (SLPs) 19, each of which is a computer program that makes up the logic structure of an IN service program (service logic). During call processing and rendering of an IN service, the SLP corresponding to the IN service is executed to provide the requested IN service. The IN services provided by the IN 1 are defined, specified, developed, tested, and withdrawn by the SCEP 15 linked to the SMP 13, and then downloaded to the SCP 9. The SMP 13 manages subscriber and network information in the SDB 11, including service-specific information and the SLPs 19.

The SSP 7 includes a Switching Service Function (SSF) 23 and a Call Control Function (CCF) 25. The SSF 23 performs the switching in the IN 1. The CCF 25 handles the normal call processing of the IN 1, and recognizes IN calls, that is, calls with associated IN services. The CCF 25 also notifies the SSF 23 when a call reaches certain predetermined stages, as well as when trigger situations are detected, as discussed below.

Figure 3:
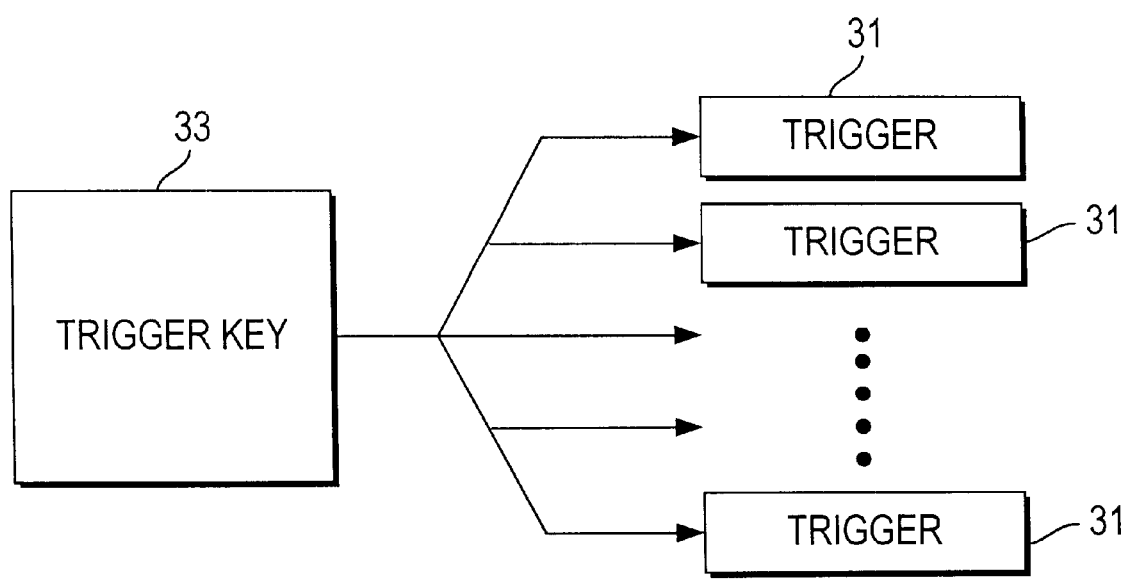
FIG. 3 illustrates a trigger key in relation to its associated triggers.
Figure 4:
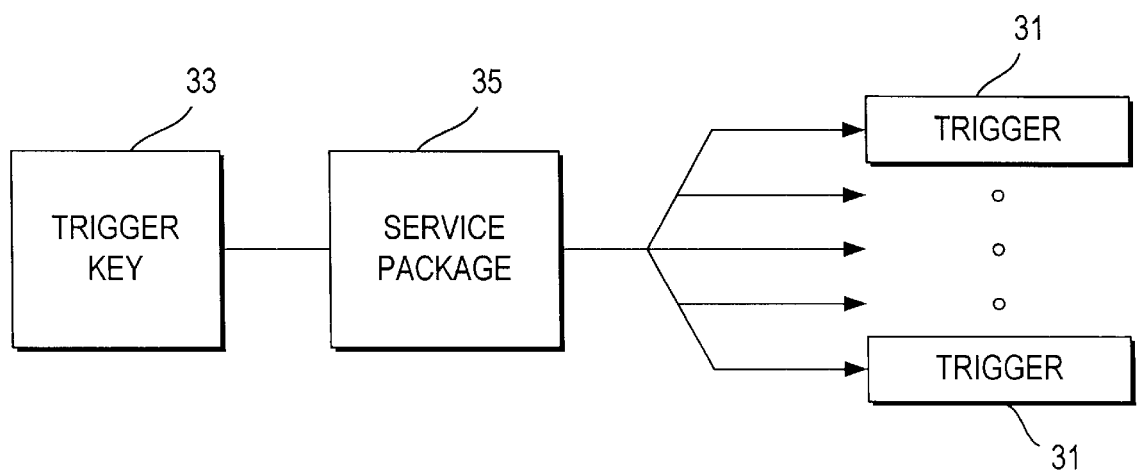
FIG. 4 illustrates a trigger key in relation to a service package.

In order for the SSP 7 to be able to recognize a call requiring an IN service and to activate the correct IN service, the IN 1 uses one or more specific triggers for the IN service. A subscriber-based trigger key is created in the record of the subscriber in the SDB 11. The trigger key indicates which IN services are available to the subscriber. Each subscriber has one trigger key, and the trigger key points to one or more triggers for IN services, either directly, as shown in FIG. 3, or by way of a service package that points to one or more triggers for a package of services, as shown in FIG. 4.

A trigger defines triggering criteria used for activating the IN service. The triggering criteria include, for example, detection points that constitute events relating to call processing. The SSF 23 stores the triggers for the IN services. If the triggering criteria defined by a trigger is satisfied, the SSF 23 activates the corresponding IN service in a SCP defined by the trigger.

More specifically, when the SSF 23 is notified of a trigger key, it sends a message containing the dialed number and general call information to the SCP identified in the trigger key. The SCP then invokes the appropriate SLP to analyze the received message in order to identify the requested IN service. The SCP then issues one or more commands to the SSF 23 to initiate appropriate actions to perform the IN service.

The SCP may be the SCP 9 located in the same exchange or operating region as the SSP 7, or it may be located in a different exchange and connected to the SSP 7 via the signaling network 21. During an IN call, a number of messages may be sent between the SSP 7 and the SCP for the IN service via the SS7 dedicated line of the signaling network 21.

Figure 5A:
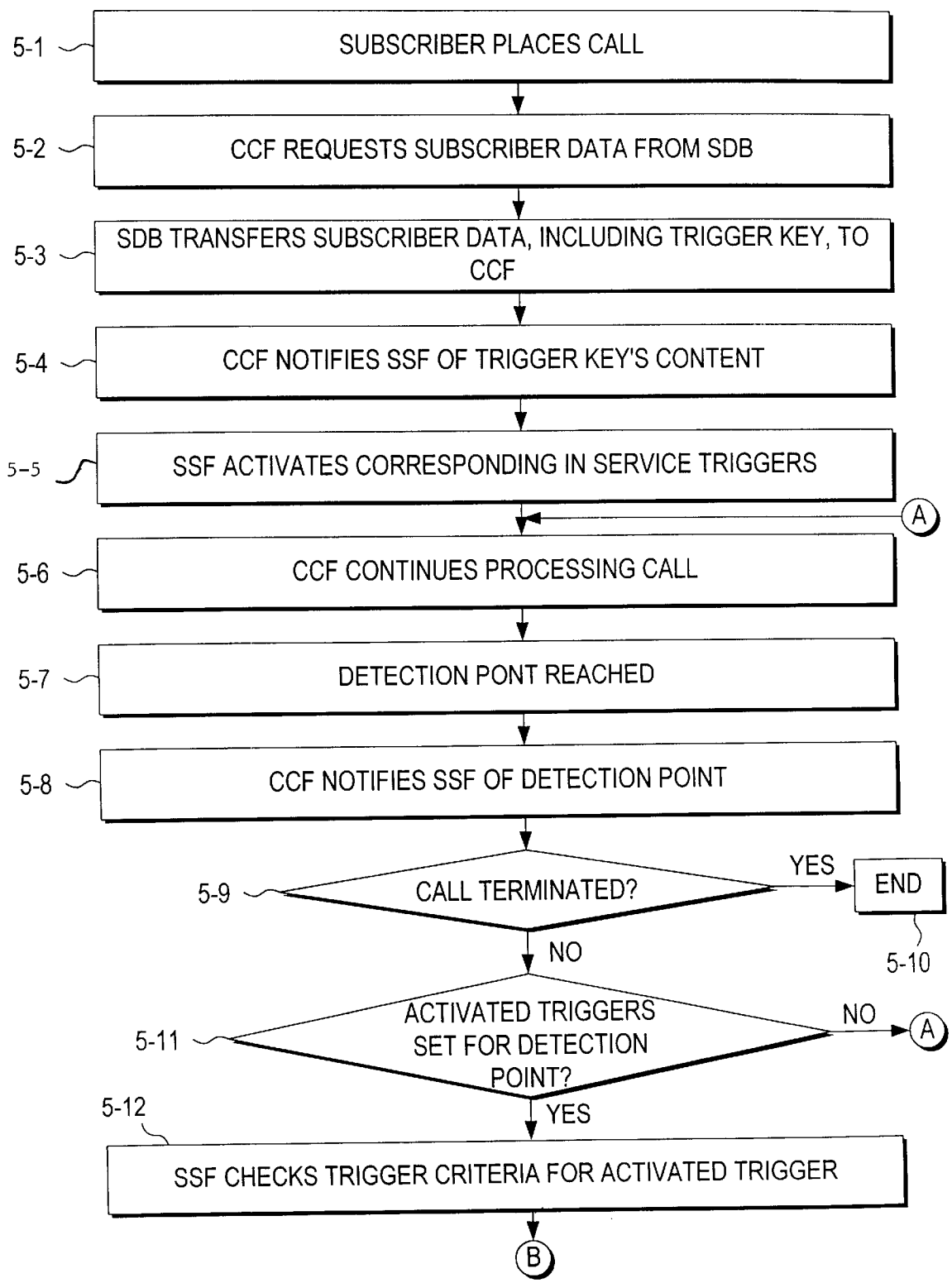

FIGS. 5A and 5B are flowcharts describing the use of a trigger key in providing IN services. First, it should be understood that trigger keys are stored in the SDB 11. When a subscriber places a call (5-1), the CCF 25 of the SSP 7 requests subscriber data of the subscriber from the SDB 11 (5-2). The SDB 11 responds by transferring the subscriber data, including the trigger key for the subscriber, to the CCF 25 (5-3). The CCF 25 notifies the SSF 23 of the SSP 7 of the trigger key's content (5-4), and the SSF 23 then activates the IN service triggers in its memory corresponding to the trigger key's content (5-5). The triggers in the memory of the SSF 23 may be in a trigger table, in which case the trigger key's content activates one or more triggers in the table.

The CCF 25 continues processing the call (5-6) until a detection point is reached (5-7). The CCF 25 then notifies the SSF 23 of the detection point (5-8). If the detection point indicates that the call has been terminated (5-9), then the IN service trigger process ends (5-10). If the call has not been terminated, then the SSF 23 determines whether any activated triggers have been set for the detection point (5-11). If no activated triggers have been set for the detection point, then the CCF 25 continues processing the call and no IN service is triggered. If an activated trigger has been set for the detection point, then the SSF 23 checks the trigger criteria for the activated trigger (5-12). If the trigger criteria for the activated trigger is satisfied (5-13), the SSF 23 activates the corresponding IN service in a SCP whose address the activated trigger gives (5-14). The SCP responds according to the activated IN service (5-15), and additional communication between the SCP and the SSF may take place for the activated IN service.

Figure 6A:
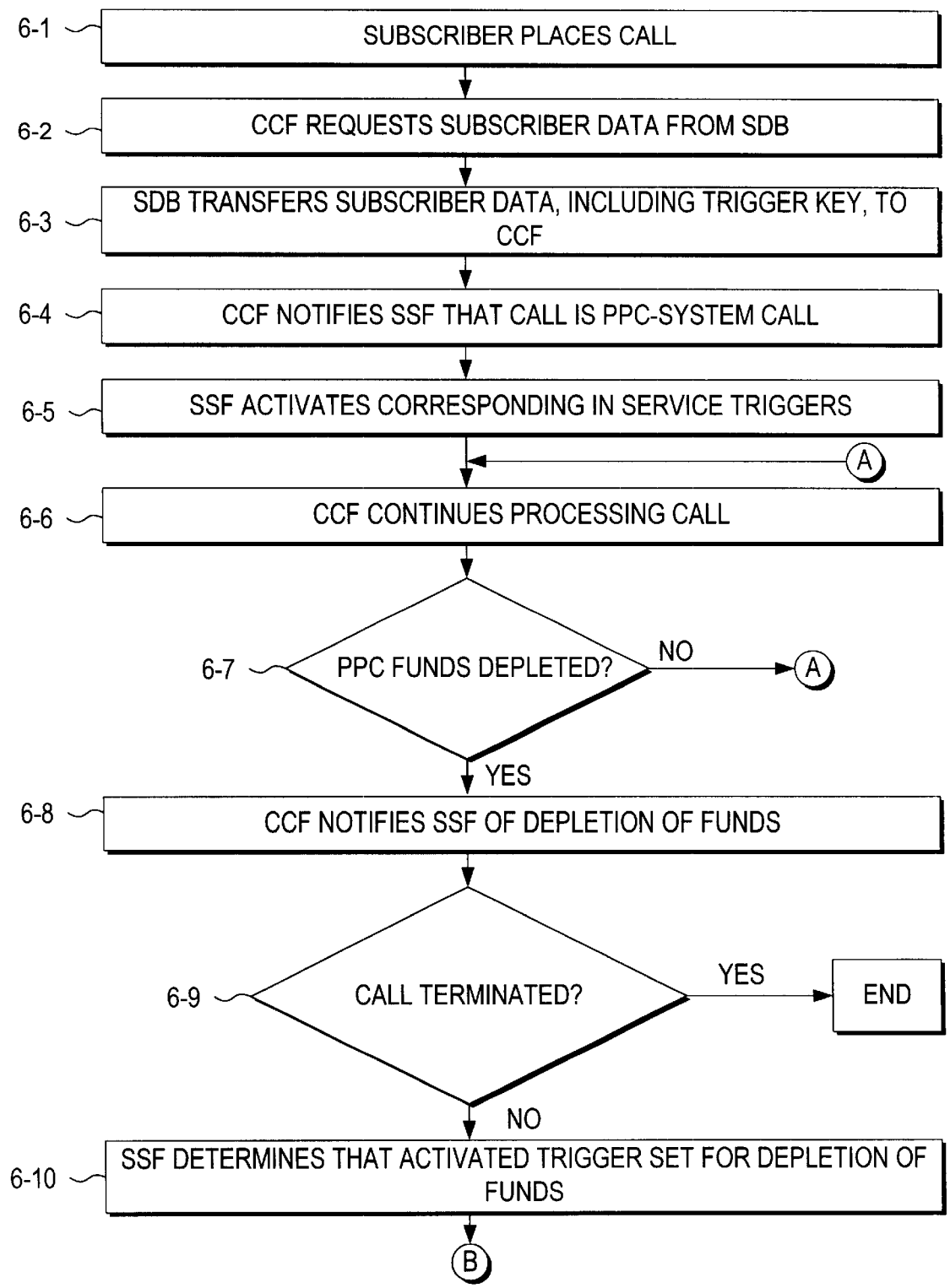

FIGS. 6A and 6B are flowcharts describing the use of a trigger key to change the billing system for a call from a Pre-Paid Charging (PPC) system to a Post-Usage Billing (PUB) system, while the call is taking place. When a subscriber places a call (6-1), the CCF of the SSP requests subscriber data of the subscriber from the SDB (6-2). The SDB responds by transferring the subscriber data, including the trigger key for the subscriber, to the CCF (6-3). The CCF notifies the SSF of the SSP of the trigger key's content, and also notifies the SSF that the call is a PPC-system call (6-4). The trigger key's content indicates, among other things, the billing rate for the PPC-system call, and that when the funds are depleted in the subscriber's PPC-system account not to terminate the call but instead to convert the call to a PUB-system call. The SSF then activates the triggers in its memory corresponding to the trigger key's content (6-5).

When the CCF detects that the funds have been depleted in the subscriber's PPC-system account (6-7), the CCF notifies the SSF of that detection point (6-8). If the call has not been terminated (6-9), the SSF then determines that an activated trigger has been set for that detection point (6-10), and that the trigger criteria for the activated trigger, that is, the depletion of the funds, has been satisfied (6-11). The SSF subsequently activates the SCP whose address the activated trigger gives (6-12). The SCP, in turn, activates the appropriate SLP to switch the billing system for the remainder of the call to the PUB system (6-13), and provides the new billing rate to the CCF (6-14), which continues processing the call in the PUB system. The CCF stores this billing information in the call's detailed record.

Figure 7A:
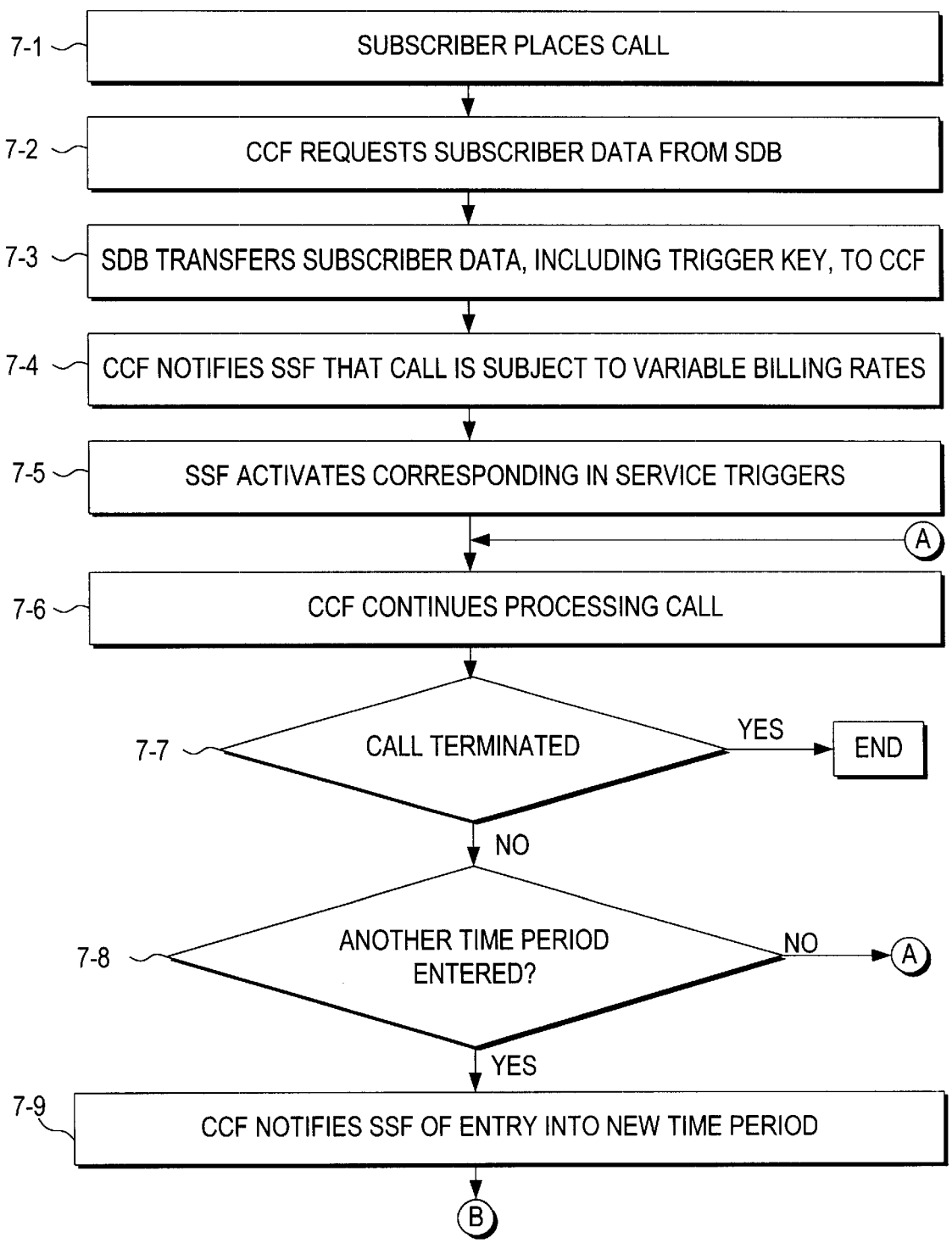

FIGS. 7A and 7B are flowcharts describing the use of a trigger key to change the billing rate for a call when the call, initiated during a fist time period having a first billing rate, continues into a second time period having a second billing rate. The call will be charged at the first billing rate for the time elapsed during the first time period, and charged at the second billing rate for the time elapsed during the second time period.

When a subscriber places a call (7-1), the CCF of the SSP requests subscriber data of the subscriber from the SDB (7-2). The SDB responds by transferring the subscriber data, including the trigger key for the subscriber, to the CCF (7-3). The CCF notifies the SSF of the SSP of the trigger key's content, and also notifies the SSF that the call is subject to variable billing rates depending on when the call takes place (7-4). The trigger key's content indicates, among other things, the current billing rate for the call, and that when the current calling time enters a new time period the billing rate changes accordingly. The SSF then activates the triggers in its memory corresponding to the trigger key's content (7-5).

When the CCF detects that the call has extended into another time period different from the time period when the call was initiated (7-8), the CCF notifies the SSF of that detection point (7-9). The SSF then determines that an activated trigger has been set for that detection point (7-10), and that the trigger criteria for the activated trigger, that is, the change in time period, has been satisfied (7-11). The SSF subsequently activates the SCP whose address the activated trigger gives (7-12). The SCP, in turn, activates the appropriate SLP to switch the billing rate for the remainder of the call to the billing rate for the current time period (7-13), and provides the new billing rate to the CCF (7-14), which continues processing the call according to the new billing rate. The CCF stores this billing information in the call's detailed record.

Figure 8B:
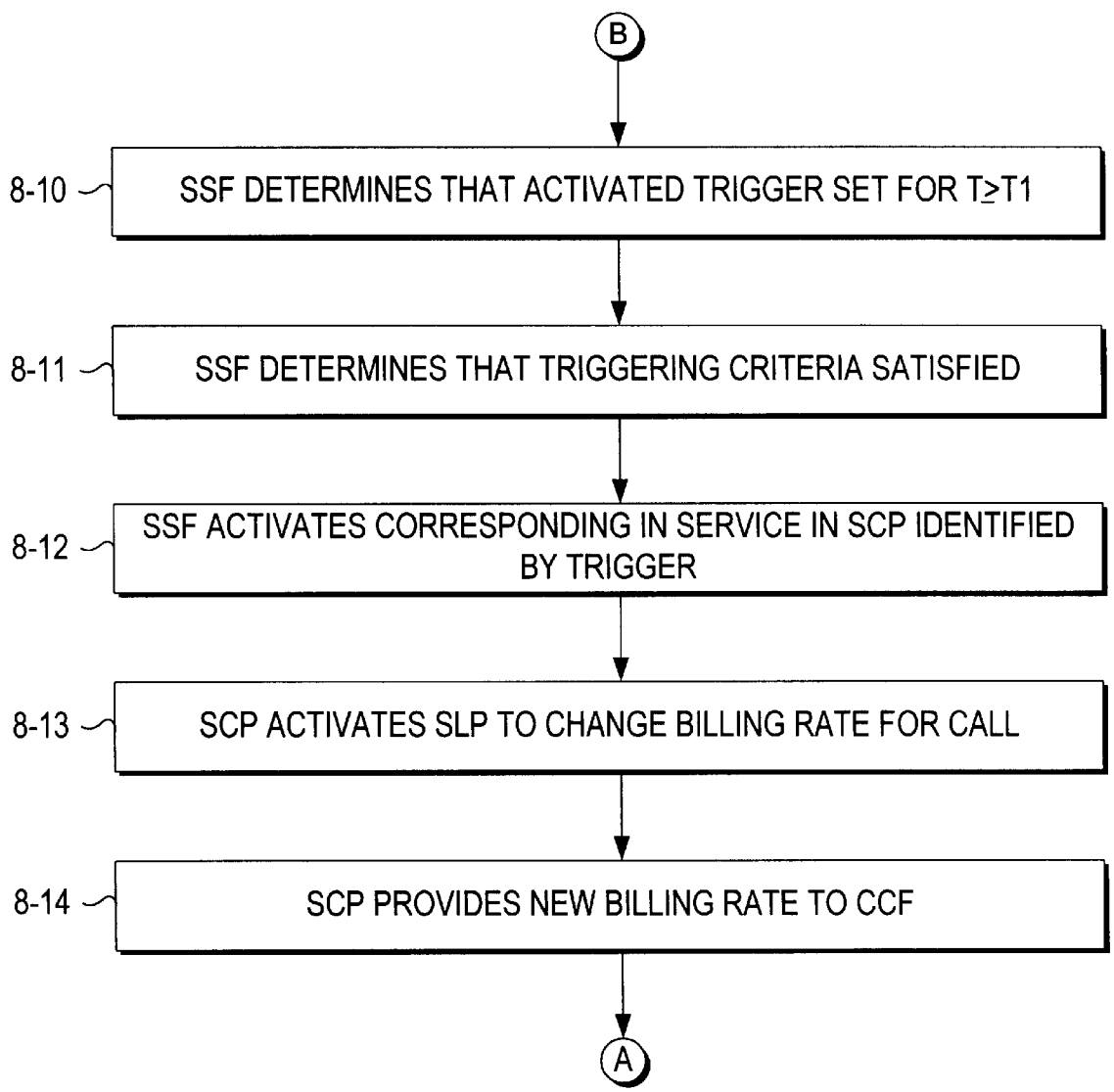

FIGS. 8A and 8B are flowcharts describing the use of a trigger key to change the billing rate for an entire call, or a portion of the call, based on the length of the call. The call will be billed at a first rate if its duration is less than a predetermined length. If the call is longer than the predetermined length, then the amount of time beyond the predetermined length will be billed at a second rate different from the first rate. That is, calls longer than the predetermined length are billed at more than one rate.

When a subscriber places a call (8-1), the CCF of the SSP requests subscriber data of the subscriber from the SDB (8-2). The SDB responds by transferring the subscriber data, including the trigger key for the subscriber, to the CCF (8-3). The CCF notifies the SSF of the SSP of the trigger key's content, and also notifies the SSF that the call is subject to variable billing rates depending on the length of the call (8-4). The trigger key's content indicates, among other things, the standard billing rate for the call, and that when the call is longer than the predetermined length of time the billing rate changes accordingly. The SSF then activates the IN service triggers in its memory corresponding to the trigger key's content (8-5).

When the CCF detects that the call has extended beyond the predetermined length (8-8), the CCF notifies the SSF of that detection point (8-9). The SSF then determines that an activated trigger has been set for that detection point (8-10), and that the trigger criteria for the activated trigger, that is, the length of the call has exceed the predetermined length, has been satisfied (8-11). The SSF subsequently activates the SCP whose address the activated trigger gives (8-12). The SCP, in turn, activates the appropriate SLP to switch the billing rate for the remainder of the call to the new billing rate (8-13), and provides the new billing rate to the CCF (8-14), which continues processing the call according to the new billing rate. The CCF stores this billing information in the call's detailed record.

Alternatively, the triggers may indicate that, instead of billing calls that last longer than the predetermined length at more than one rate, the longer calls will be billed at a single rate different from the standard billing rate charged for shorter calls.

Figure 9:
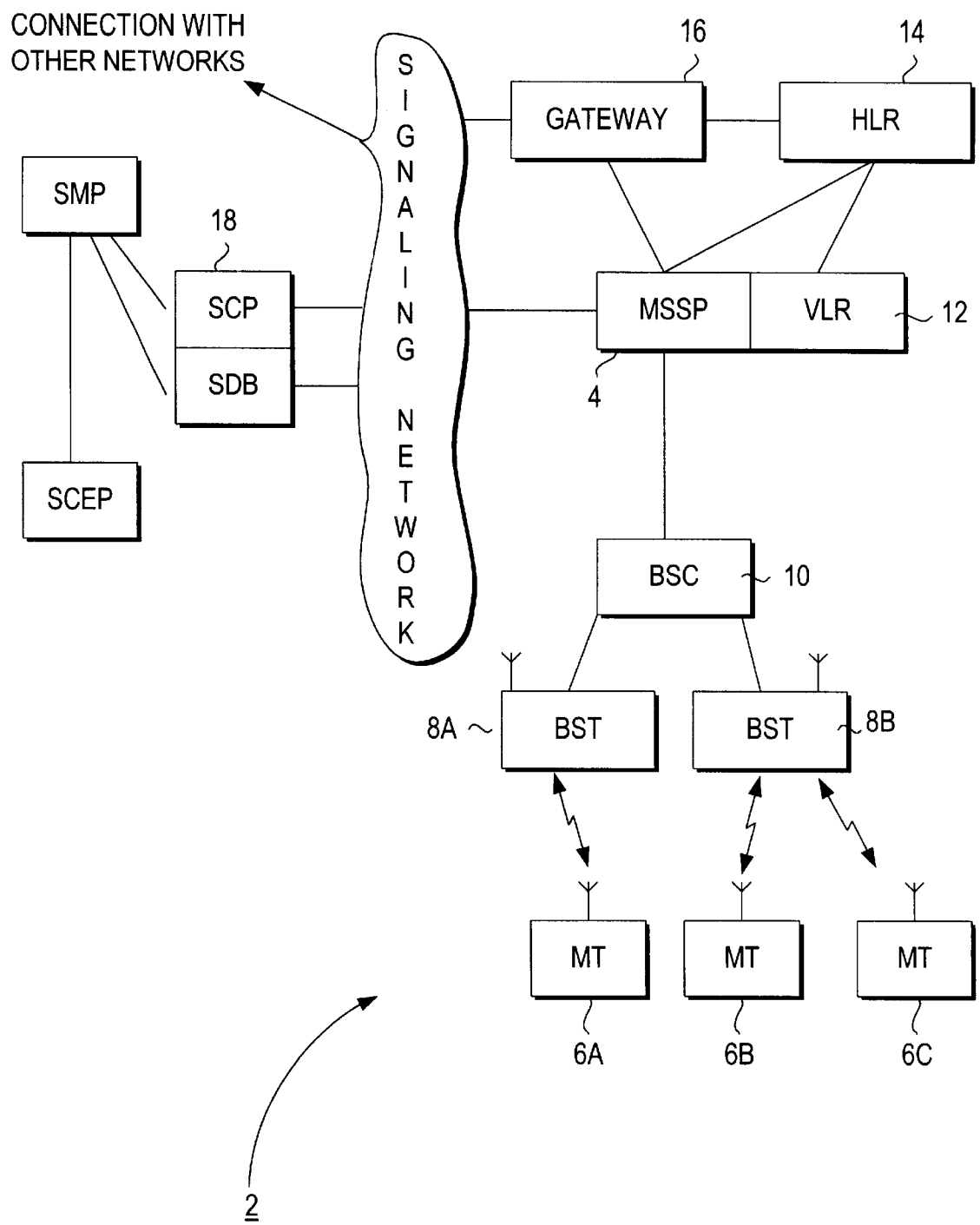
FIG. 9 is a schematic diagram of a Mobile Intelligent Network according to an embodiment of the present invention.

The signaling network 21 connects the IN 1 of FIG. 1 with a Mobile Intelligent Network (MIN) 2, which is schematically shown in FIG. 9. A Mobile Service Switching Point (MSSP) 4 handles the switching of incoming and outgoing calls. The MSSP 4 performs functions similar to those of the SSP 7 of the IN 1. In addition, the MSSP 4 performs functions uniquely characteristic to the MIN 2, such as location management of Mobile Terminals (MTs) 6a, 6b, 6c, and management of records for the mobile subscribers corresponding to the MTs 6a, 6b, 6c. The MTs 6a, 6b, 6c, which are commonly known as cellular telephones, are connected to the MSSP 4 by Base Station Transceivers (BSTs) 8a, 8b, which are commonly known as cellular towers. The BSTs 8a, 8b are controlled by a Base Station Controller (BSC) 10, which is connected to the MSSP 4.

The MSSP 4 is connected to a SCP 14 via the signaling network 21. The SCP 14 performs functions similar to the SCP 9 of FIG. 2, discussed above. A gateway 16 connects the MSSP 4 with other networks, via the signaling network 21, so that calls may be routed between the MTs 6a, 6b, 6c in the MIN 2 and MTs in another MIN, as well as telephones and other terminals in a PSTN, such as the IN 1 of FIG. 1.

A MIN operates in a plurality of geographic regions called cells, and the cells are further grouped into geographic areas called Location Areas (LAs). Each cell contains at least one BST, and each LA contains at least one MSSP. A BST communicates with MTs in its cell.

Each MT is associated with a home LA. An MSSP deployed in a LA is responsible for handling the switching and routing of calls to and from MTs that are physically located in the LA. If a MT roams outside its assigned home LA into another LA, the MSSP deployed in the other LA where the roaming MT is located will become responsible for providing the switching and call routing requirements of the roaming MT.

As shown in FIG. 9, the MSSP 4 is associated with a Home Location Register (HLR) 14, which is a data base that contains the records for the mobile subscribers corresponding to each of the MTs having the LA of the MSSP 4 assigned as its home LA. The MSSP 4 is analogous to the SSP 7 of FIG. 2, discussed above.

Each record in the HLR 14 includes a Mobile Identification Code (MIC) for identifying its corresponding MT, information regarding the type of service associated with that MT, and information defining a current location of that MT. Therefore, if a MT roams into another LA outside its home LA, the record for that MT will be updated to reflect its current location, so that incoming calls to that MT will be properly forwarded to the other LA.

More specifically, when a MT roams into a new LA and is turned on, the roaming MT attempts to register with the MSSP deployed in that LA by transmitting its MIC to the MSSP. The MSSP then communicates with the HLR associated with the received MIC, to inform the HLR of the current location of the roaming MT, and to receive mobile subscriber information from the HLR necessary to provide mobile services to the newly registering roaming MT.

The MSSP 4 is associated with a Visitor Location Register (VLR). 12, which temporarily contains records for the mobile subscribers corresponding to each of the visiting MTs that are roaming in the LA of the MSSP 4. If a MT enters the LA of the MSSP 4, a record identifying that MT as a visitor is established in the VLR 12, and the record is deleted when the visiting MT leaves the LA of the MSSP 4.

When a call is made to a roaming MT, the calling terminal dials a cellular number associated with the roaming MT, and the call is routed to a gateway corresponding to the dialed cellular number. The gateway queries the HLR of the called roaming MT for the roaming location of the roaming MT. The HLR queries the MSSP where the roaming MT is currently located and requests a temporary location directory number, which is returned to the HLR and the gateway. The gateway then uses the temporary location directory number to route the call to the roaming MT.

In order for a MSSP to be able to recognize a call requiring IN service and to activate the correct triggers for the IN service, a subscriber-based trigger key is created in the record of the mobile subscriber. The trigger key indicates which IN services are available to the mobile subscriber. Each mobile subscriber has one trigger key, and the trigger key points to one or more triggers for IN services, either directly, as shown in FIG. 3, or by way of a service package that points to one or more triggers for a package of services, as shown in FIG. 4.

A trigger key for a MT is created in the HLR of the home LA for the MT, and may be transferred from the HLR to a VLR, along with the MT's corresponding subscriber record, when the MT roams outside its home LA. The trigger key is used for activating an IN service in both an originating mobile call, that is, a call from a MT, or a terminating mobile call, that is, a call to a MT. In the terminating call, the triggering of an IN service may take place either in the gateway or in the MSSP of the MIN.

Figure 10B:
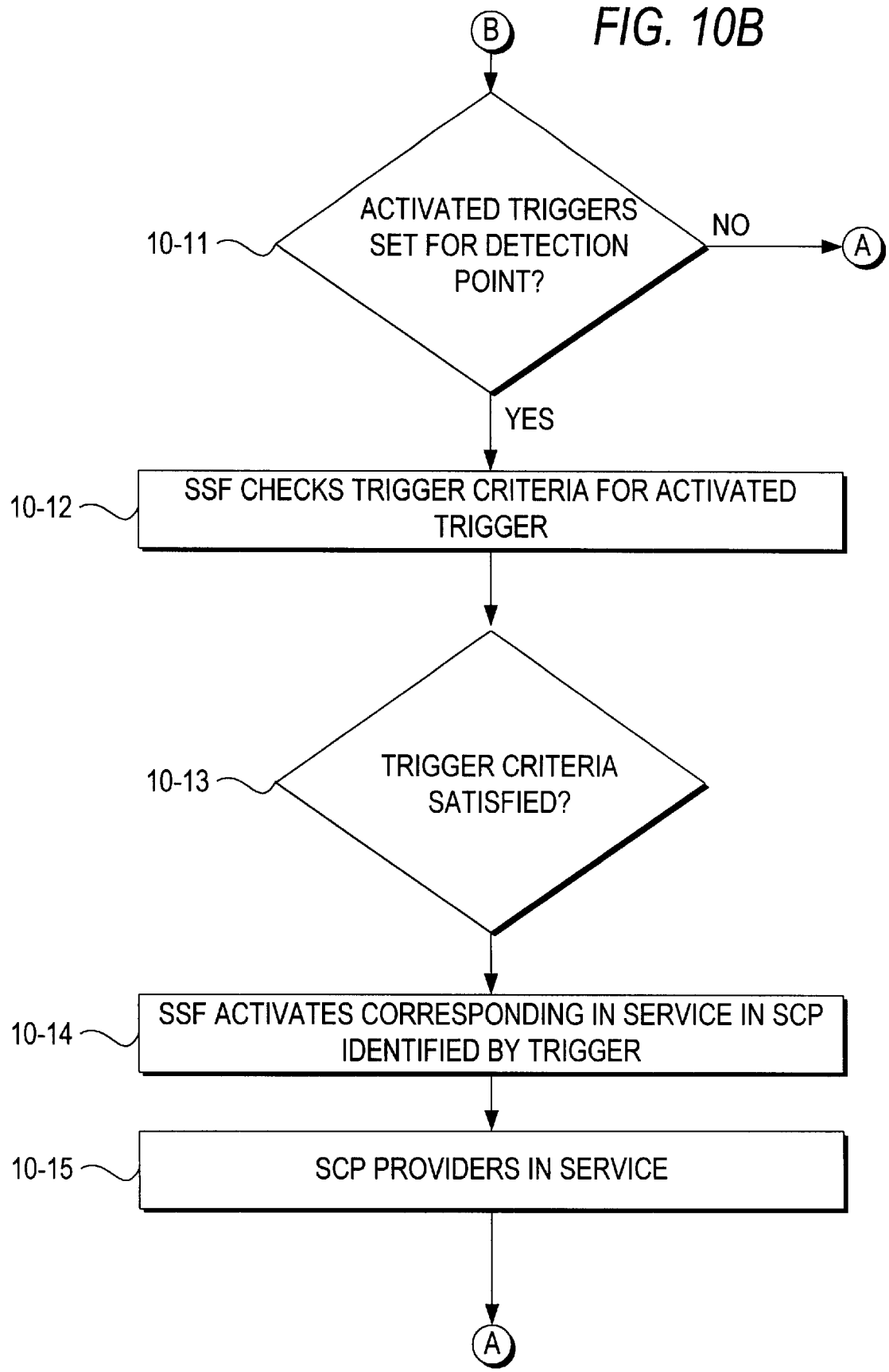

FIGS. 10A and 10B are flowcharts describing the use of a trigger key in an originating mobile call. First, it should be understood that the VLR of the MSSP has stored the trigger key of the mobile subscriber, obtained from the HLR of the mobile subscriber, in the visitor record for the mobile subscriber currently in the LA of the VLR. When the mobile subscriber places a call from the MT (10-1), the CCF of the MSSP requests subscriber data of the mobile subscriber from the VLR (10-2).

The VLR responds by transferring the subscriber data, including the trigger key, to the CCF (10-3). The CCF notifies the SSF of the MSSP of the trigger key's content (10-4), and the SSF then activates the IN service triggers in its memory corresponding to the trigger key's content (10-5). The triggers in the memory of the SSF may be in a trigger table, in which case the trigger key's content activates one or more triggers in the table.

The CCF continues processing the call (10-6) until a detection point is reached (10-7). The CCF notifies the SSF of the detection point (10-8). If the detection point indicates that the call has been terminated (10-9), then the IN service trigger process ends (10-10). If the call has not been terminated, then the SSF determines whether any activated triggers have been set for the detection point (10-11). If no activated triggers have been set for the detection point, then the CCF continues processing the call and no IN service is triggered. If an activated trigger has been set for the detection point, then the SSF checks the trigger criteria for the activated trigger (10-12). If the trigger criteria for the activated trigger is satisfied (10-13), the SSF activates the corresponding IN service in a SCP whose address the activated trigger gives (10-14). The SCP responds according to the activated IN service (10-15), and additional communication between the SCP and the SSF may take place for the activated IN service.

The use of a trigger key in a terminating mobile call is similar to its use in an originating mobile call. Again, it should be understood that the VLR of the MSSP has stored the trigger key of the mobile subscriber, obtained from the HLR of the mobile subscriber, in the visitor record for the mobile subscriber currently in the LA of the VLR. The MSSP receives the terminating call, and the CCF of the MSSP requests subscriber data of the called mobile subscriber from the VLR. The VLR responds by transferring the subscriber data, including the trigger key, to the CCF. The CCF notifies the SSF of the MSSP of the trigger key's content, and the SSF then uses the trigger key's content as described above for an originating mobile call.

Figure 11B:
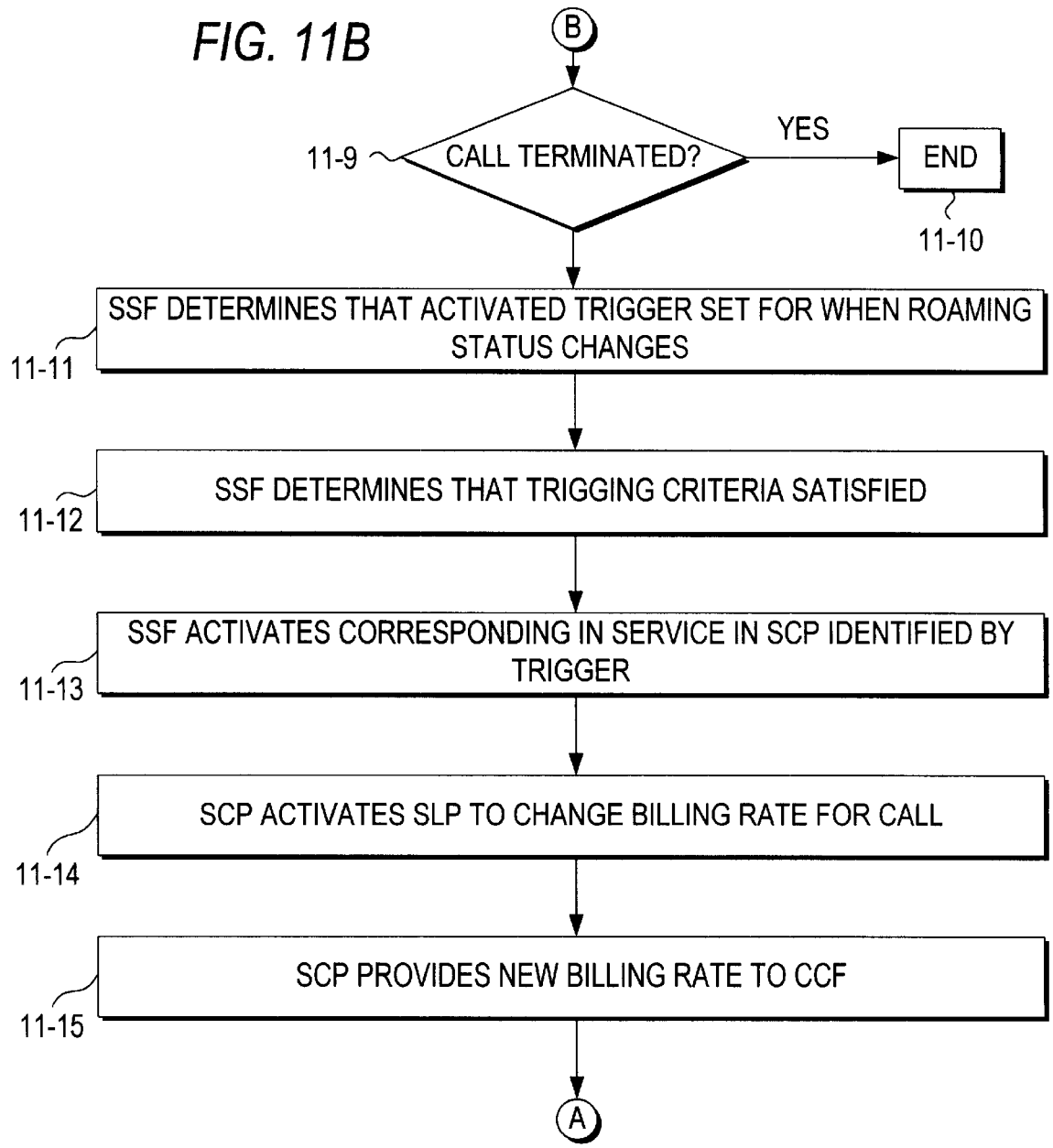

FIGS. 11A and 11B are flowcharts describing the use of a trigger key to change the billing rate during a mobile call. If any of the calling parties is outside their home LA during the call, the call is billed at a roaming rate, and if both parties become located within their home LA during the call, the billing rate will change to a standard rate.

Again, it should be understood that the VLR of the MSSP has stored the trigger key of the mobile subscriber, obtained from the HLR of the mobile subscriber, in the visitor record for the mobile subscriber currently in the LA of the VLR. When the mobile subscriber places a call from the MT (11-1), the CCF of the MSSP requests subscriber data of the mobile subscriber from the VLR (11-2). The VLR responds by transferring the subscriber data, along with the trigger key, to the CCF (11-3). The CCF notifies the SSF of the MSSP of the trigger key's content, and also notifies the SSF that the call is subject to variable billing rates depending on the location of the call parties (11-4). The trigger key's content indicates, among other things, the roaming rate for the call and that when both call parties are no longer roaming the billing rate changes accordingly. The SSF then activates the IN service triggers in its memory corresponding to the trigger key's content (11-5).

When the CCF detects that both parties are no longer roaming (11-7), the CCF notifies the SSF of that detection point (11-8). The SSF then determines that an activated trigger has been set for that detection point (11-11), and that the trigger criteria for the activated trigger has been satisfied (11-12), that is, the roaming status of the call has been negated. The SSF subsequently activates the SCP whose address the activated trigger gives (11-13). The SCP, in turn, activates the appropriate SLP to switch the billing rate for the call to the standard billing rate (11-14), and provides the standard billing rate to the CCF (11-15), which continues processing the call according to the standard billing rate. The CCF stores this billing information in the call's detailed record. Should the roaming status be reinstated during the call, the billing rate will change accordingly. A single mobile call may have its billing rate change more than once during the call.

Figure 12A:
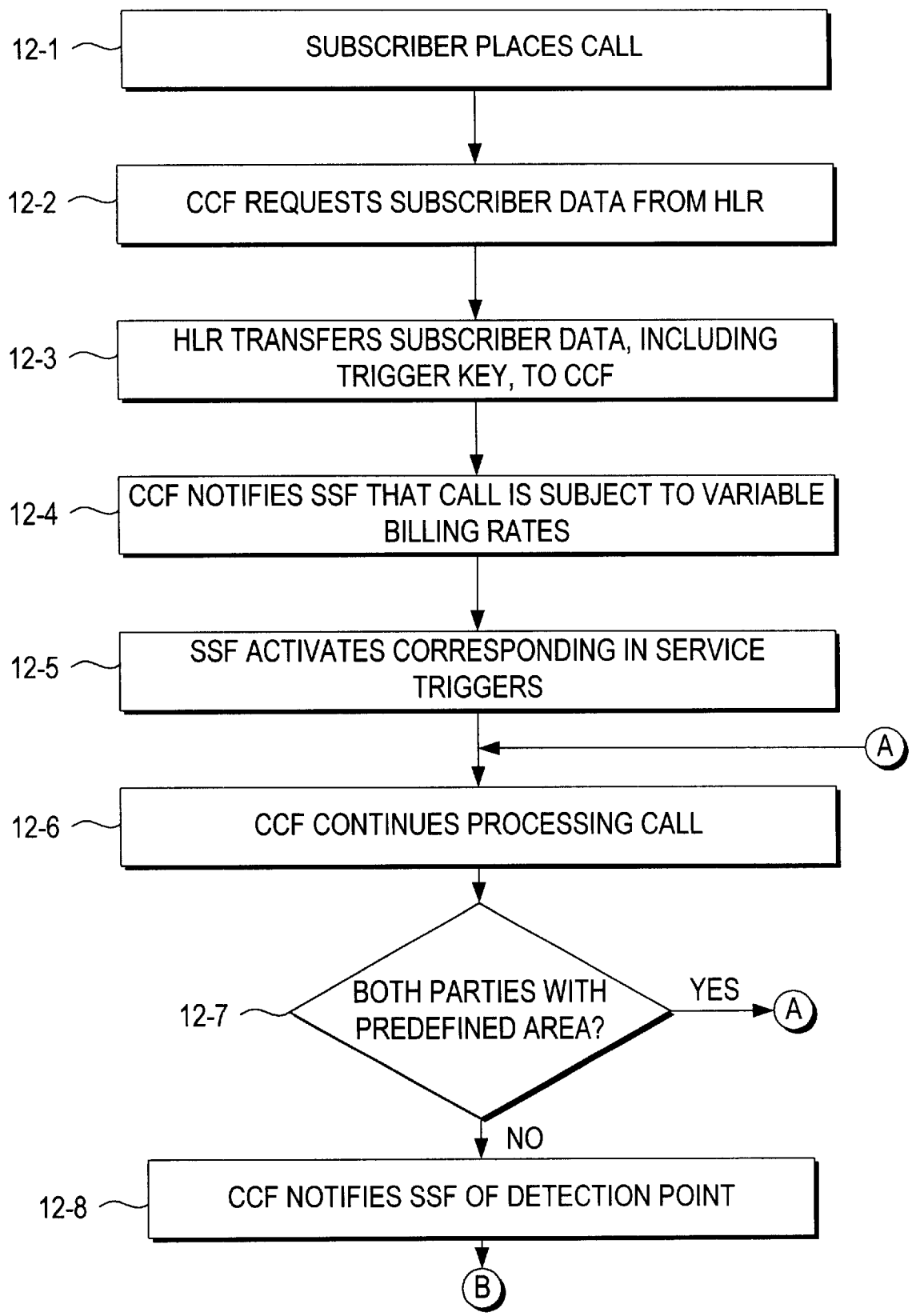

FIGS. 12A and 12B are flowcharts describing the use of a trigger key to change the billing rate for a non-roaming mobile call based on the location of either of the communicating parties. The call will be billed at a first rate if both the communicating parties are within a predetermined area, such as a predetermined cell, for example. If either of the communicating parties moves outside the predetermined area, the call will be billed at a second rate different from the first rate for the time that one or more of the communicating parties is outside the predetermined area.

When a subscriber places a call (12-1), the CCF of the MSSP requests subscriber data of the subscriber from the HLR (12-2). The HLR responds by transferring the subscriber data, including the trigger key for the subscriber, to the CCF (12-3). The CCF notifies the SSF of the SSP of the trigger key's content, and also notifies the SSF that the call is subject to variable billing rates depending on whether the call parties are within a predefined area (12-4). The trigger key's content indicates, among other things, the standard billing rate for the call, and that when both call parties are no longer within the predefined area the billing rate changes accordingly. The SSF then activates the IN service triggers in its memory corresponding to the trigger key's content (12-5).

When the CCF detects that one or both of the call parties has moved outside the predefined area (12-7), the CCF notifies the SSF of that detection point (12-8). The SSF then determines that an activated trigger has been set for that detection point (12-11), and that the trigger criteria for the activated trigger (12-12), that is, both call parties are no longer within the predefined area. The SSF subsequently activates the SCP whose address the activated trigger gives (12-13). The SCP, in turn, activates the appropriate SLP to switch the billing rate for the remainder of the call to the new billing rate (12-14), and provides the new billing rate to the CCF (12-15), which continues processing the call according to the new billing rate. The CCF stores this billing information in the call's detailed record. Should both call parties later become located within the predefined area, the billing rate will change accordingly.

Such a billing scheme enables telecommunication service providers to adopt promotion programs targeting particular subscribers located within a definable predetermined area, such as college students on a college campus, for example. If a mobile call occurs within the predetermined area of the campus the students are billed at a first rate. However, if one or more of the students travels outside the campus during the call, even if both students are within the same home LA, the billing rate will be changed to a rate higher than the first rate.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

As will be appreciated, there are countless telecommunication services for which it may be desirable to utilize the triggering system of the present invention, to enable real-time changes in the billing rates for the telecommunication services. The above-described preferred embodiments only illustrate a few exemplary telecommunication services, and in no way should be construed as limiting the application of the inventive apparatus and methods to those configurations.

As will be appreciated, many different types of systems, including systems for providing access to the Internet, can utilize the features of the present invention. The inventive methods can also be embodied on computer-executable code that is stored on a computer-readable medium, for example, a floppy disk, a hard drive, removable media, an optical memory, a magneto-optical memory, a RAM, a ROM, a flash memory, so-called "memory sticks," and the like.

In addition to the telecommunications industry, the present invention may be applied to other industries, such as the power industry, the cable television industry, etc., where it may be desirable to vary the billing rate with parameters such as usage and time of day, for example.

What is claimed:

1. An apparatus for billing a subscriber for a service provided over a network, said apparatus comprising:

an electronic memory configured to store a record and trigger information for the subscriber;

an electronic detector circuit configured to detect while the service is being provided whether a trigger corresponding to the trigger information has occurred; and an electronic control circuit configured to effect a real-time billing rate change while the service is being provided, when said detector circuit detects that the trigger has occurred.

2. The apparatus according to claim 1, wherein said electronic control circuit changes the billing rate at least once during the service, such that the service is billed at more than one rate.

3. An apparatus for billing a subscriber for a service provided over a network, said apparatus comprising:

an electronic memory configured to store a record and trigger information for the subscriber;

an electronic detector circuit configured to detect whether a trigger corresponding to the trigger information has occurred during the service; and an electronic control circuit configured to change a billing rate for the service, while the service is being provided, when said detector circuit detects that the trigger has occurred, wherein the trigger indicates that a time duration of the service is equal to or greater than a predetermined time duration.

4. The apparatus according to claim 1, wherein the trigger indicates that a time period of the service has changed to another time period.

5. The apparatus according to claim 1, wherein the trigger indicates that the subscriber has moved out of a predetermined area.

6. The apparatus according to claim 1, wherein the trigger indicates that the subscriber has moved into a predetermined area.

7. The apparatus according to claim 1, wherein
    the service is a telephone call, and
    the trigger indicates that a called party has moved out of a predetermined area.

8. The apparatus according to claim 1, wherein
    the service is a telephone call, and
    the trigger indicates that a called party has moved into a predetermined area.

9. An apparatus for billing a subscriber for a service provided over a network, said apparatus comprising:

an electronic memory configured to store a record and trigger information for the subscriber;

an electronic detector circuit configured to detect whether a trigger corresponding to the trigger information has occurred during the service; and an electronic control circuit configured to change a billing rate for the service, while the service is being provided, when said detector circuit detects that the trigger has occurred, wherein the service is a telephone call in a pre-paid charging system in which the subscriber has an account, the trigger indicates that funds in the account have been depleted, and the billing rate is changed to a rate in a Post-Usage Billing system.

10. A programmable computer for use in billing a subscriber for a service provided over a network, said programmable computer comprising:

a memory adapted to store computer-executable program code; and a processor adapted to execute the program code stored in said memory, wherein the computer-executable program code includes:

code for accessing from a data base a record and trigger information corresponding to the subscriber, code for detecting while the service is being provided whether a trigger corresponding to the trigger information has been satisfied, and code for effecting a real-time billing rate change while the service is being provided, when the code for detecting detects that the trigger has been satisfied.

11. The programmable computer according to claim 10, wherein the changing step changes the billing rate at least once during the service, such that the service is billed at more than one rate.

12. A method of billing a subscriber for a service provided over a network, said method comprising the steps of:

accessing from a data base a record and trigger information corresponding to the subscriber;

detecting while the service is being provided whether a trigger corresponding to the trigger information has been satisfied; and effecting a real-time billing rate change while the service is being provided, when said detecting step detects that the trigger has been satisfied.

13. The method according to claim 12, wherein said changing step changes the billing rate at least once during the service, such that the service is billed at more than one rate.

14. An apparatus for billing a subscriber for a service provided over a network, said apparatus comprising means for storing a record and trigger information for the subscriber;

means for detecting while the service is being provided whether a trigger corresponding to the trigger information has occurred; and means for effecting a real-time billing rate change while the service is being provided, when said detector means detects that the trigger has occurred.

15. The apparatus according to claim 14, wherein said control means changes the billing rate at least once during the service, such that the service is billed at more than one rate.

16. A computer-readable storage medium storing a program for implementing a method of billing a subscriber for a service provided over a network, the program comprising:

code for an accessing step of accessing from a data base a record and trigger information corresponding to the subscriber;

code for a detecting step of detecting while the service is being provided whether a trigger corresponding to the trigger information has been satisfied; and code for a rate changing step of effecting a real-time billing rate change while the service is being provided, when the detecting step detects that the trigger has been satisfied.

17. The computer-readable storage medium according to claim 16, wherein the rate changing step changes the billing rate at least once during the service, such that the service is billed at more than one rate.

* * * * *